No. 855,946. PATENTED JUNE 4, 1907.
C. C. HALGREN.
NUT LOCK.
APPLICATION FILED JAN. 7, 1907.
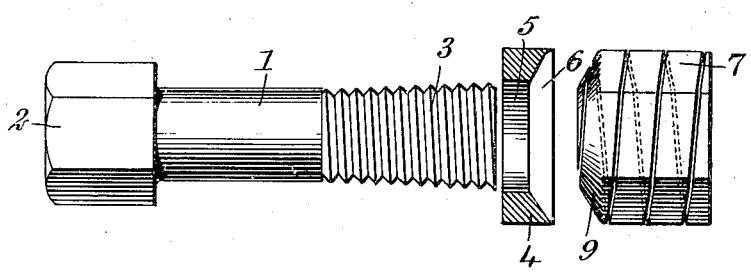
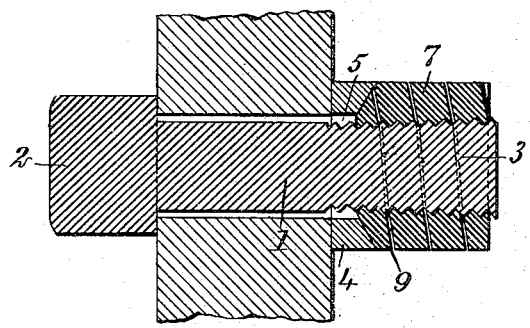
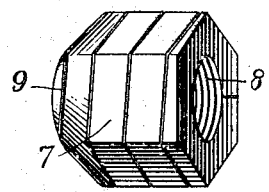
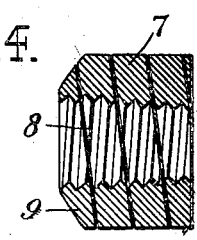
WITNESSES
INVENTOR
Charles C. Halgren
BY
ATTORNEYS

UNITED STATES PATENT OFFICE.

CHARLES CONRAD HALGREN, OF NEW YORK, N. Y.

NUT-LOCK.

No. 855,946.   Specification of Letters Patent.   Patented June 4, 1907.

Application filed January 7, 1907. Serial No. 351,136.

*To all whom it may concern:*

Be it known that I, CHARLES CONRAD HALGREN, a citizen of the United States, and a resident of the city of New York, (borough of Manhattan,) county and State of New York, have invented a new and Improved Nut-Lock, of which the following is a full, clear, and exact description.

This invention is directed to improvements in nut locks relating to that type of nut lock embodying in its construction a helical nut.

The nature of the construction is such that when the nut is threaded upon the bolt and forced to its seat, its threads will automatically be forced into tight embrace with the threads of the bolt and thus securely lock them together.

Reference is to be had to the accompanying drawings forming a part of this specification, in which similar characters of reference indicate corresponding parts in all the figures.

Figure 1 is a side elevation of my improved nut lock with the elements thereof disassembled; Fig. 2 is a central, longitudinal, sectional view of the nut lock when applied; Fig. 3 is a perspective view of the nut; and Fig. 4 is a central longitudinal section through the same.

The preferred embodiment of the invention consists of a bolt 1 having a head 2 and a threaded outer end 3, as clearly shown. This threaded end of the bolt is uniformly tapered inwardly from the outer end, in order that the threads may be of greater diameter at said outer end of the bolt, than those adjacent to the head 2.

In connection with the bolt 1 is provided a washer 4, having a bore 5 of such diameter as to freely pass over the outer end of the bolt, and a countersunk portion 6 in its upper face, providing a conical seat for a helical nut 7. The nut 7 is constructed with a threaded bore 8 and a conical end 9, the latter being of such pitch as to neatly fit the countersunk seat in the washer 4 when the nut lock is assembled. The bore 8 of the nut as shown in Fig. 4, is formed preferably with the same taper as the threaded end of the bolt, said taper, however, being arranged in reverse order, locating the larger end of the bore adjacent to the conical end 9. The bore of the nut at this point should be of sufficient diameter to readily screw upon the enlarged outer end of the bolt, the latter acting to expand the nut as it is pulled up in place.

As shown, the convolutions of the nut run reversely to the threaded portion of the bolt; that is to say, should a bolt having a right-hand thread, as illustrated, be employed, the convolutions of the nut should be left-hand or run in the opposite direction. By this construction, on forcing the nut to its seat in the washer 4, the frictional contact of the conical end 9 of the nut will wind up the coils of the nut at this end and force the threads of the same into tight embrace with those on the bolt and thus securely lock the parts together. If there is any wear between the nut, washer, or the parts bolted, it is obvious that the nut will expand and compensate therefor.

Although I have described the invention in detail, I regard the precise construction as not material provided the essential characteristics are employed as pointed out in the annexed claims.

Having thus described my invention, I claim as new and desire to secure by Letters Patent:

1. A nut lock comprising a threaded bolt, a washer having a conical seat arranged on said bolt, and a helical nut having a conical end to fit said seat, with the convolutions thereof running oppositely to the threads on the bolt, whereby said nut will tend to coil up when forced to its seat.

2. A nut lock comprising a bolt having an inwardly-tapered, threaded end, and a helical nut having a threaded bore likewise but reversely tapered, screwed on said bolt, the convolutions of said nut running oppositely from the threads of the bolt, whereby said nut will tend to coil up when forced to its seat.

3. A nut lock comprising a bolt having an inwardly-tapered, threaded end, a washer having a conical seat arranged on said bolt, and a helical nut having a conical end and a reversely tapered bore, threaded on said bolt with the conical end thereof engaged with the conical seat of the washer.

4. A nut lock comprising a bolt having a tapered thread, and an expansible nut having a threaded bare reversely tapered screwed on said bolt.

5. A nut lock comprising a bolt having a tapered thread, and a helical nut having a threaded bore reversely tapered screwed on said bolt.

In testimony whereof I have signed my name to this specification in the presence of two subscribing witnesses.

CHARLES CONRAD HALGREN.

Witnesses:
JOHN BYARD HALGREN, Jr.,
GEO. W. STONER.